US005887072A

United States Patent [19]

Bashomatsu et al.

[11] Patent Number: 5,887,072

[45] Date of Patent: Mar. 23, 1999

[54] FULL ADDRESS READING APPARATUS

[75] Inventors: Takeshi Bashomatsu; Hiroyuki Nagahori, both of Tokyo, Japan

[73] Assignee: NEC Corporation, Tokyo, Japan

[21] Appl. No.: 804,841

[22] Filed: Feb. 24, 1997

[30] Foreign Application Priority Data

Feb. 29, 1996 [JP] Japan .................................... 8-069370

[51] Int. Cl.$^6$ ........................................ G06K 9/00

[52] U.S. Cl. ........................................ 382/101; 209/584

[58] Field of Search .................................... 382/100, 101, 382/102, 185, 227; 209/584; 705/406; 704/2, 3, 8

[56] References Cited

FOREIGN PATENT DOCUMENTS 2181287 7/1990 Japan .
4205686 7/1992 Japan .

OTHER PUBLICATIONS

K. Egami et al.; "OCR Address Reader/Sorter for Overseas Market"; NEC Technical Report, vol. 44, No. 3 (1991): pp. 56–60.

T. Ishikawa et al.; "OCR Address Reading/Letter Sorting Machine for the Ministry of Posts and Telecommunications of Japan"; NEC Technical Report, Vol. 44, No. 3 (1991); pp. 25–30.

*Primary Examiner*—Jon Chang
*Assistant Examiner*—Jayanti K. Patel
*Attorney, Agent, or Firm*—Whitham, Curtis & Whitham

[57] ABSTRACT

A full address reading apparatus includes a Japanese full address reader, an English full address reader, and a selector. The Japanese full address reader reads a full address under an assumption that a postal code and address are written on a mail item as a read target in a format using Japanese language. The English full address reader reads a full address under an assumption that a postal code and address are written on a mail item as a read target in a format using English Language. The selector determines reliability levels of read results for the same read target from the Japanese and English full address readers and selects and outputs a read result having a higher reliability level from the read results from the Japanese and English full address readers.

8 Claims, 9 Drawing Sheets

SCANNER
1
IMAGE INFORMATION
2
JAPANESE FULL ADDRESS READER
3
ENGLISH FULL ADDRESS READER
JAPANESE FULL ADDRESS READ RESULT
ENGLISH FULL ADDRESS READ RESULT
4c
4
4a
THIRD DETERMINATION UNIT
4b
5
FIRST DETERMINATION UNIT
SELECTOR
SECOND DETERMINATION UNIT
ADDRESS AND POSTAL CODE COLLATION TABLE
COMPARATOR
4d
FULL ADDRESS READ RESULT

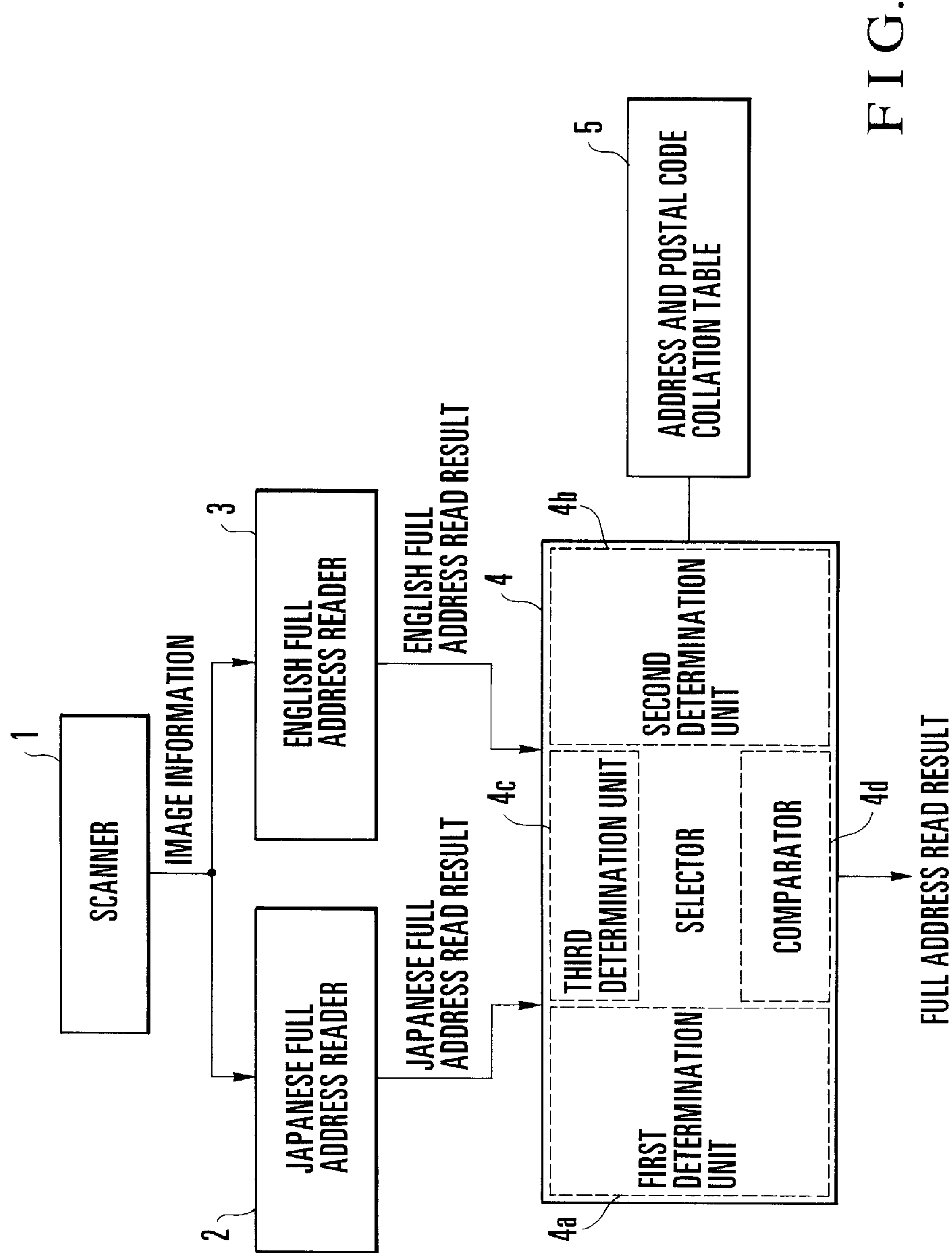
F I G. 1

| | ADDRESS | POSTAL CODE |
|---|---|---|
| A | 東京都 : TOKYO | 100, 101, . . . , 209 |
| | 神奈川県 : KANAGAWA-KEN | 210, 122, . . . , 259 |
| | | |
| B | 千代田区 : CHIYODA-KU | 100, 101, 102 |
| | 中央区 : CHUO-KU | 103, 104 |
| | | |
| | 調布市 : CHOFU-CITY | 182 |
| | 府中市 : FUCHU-CITY | 183 |
| | 小金井市 : KOGANEI-CITY | 184 |
| | | |
| | 鶴岡市 : TSURUOKA-CITY | 997 |
| | 酒田市 : SAKATA-CITY | 998 |

FIG. 2

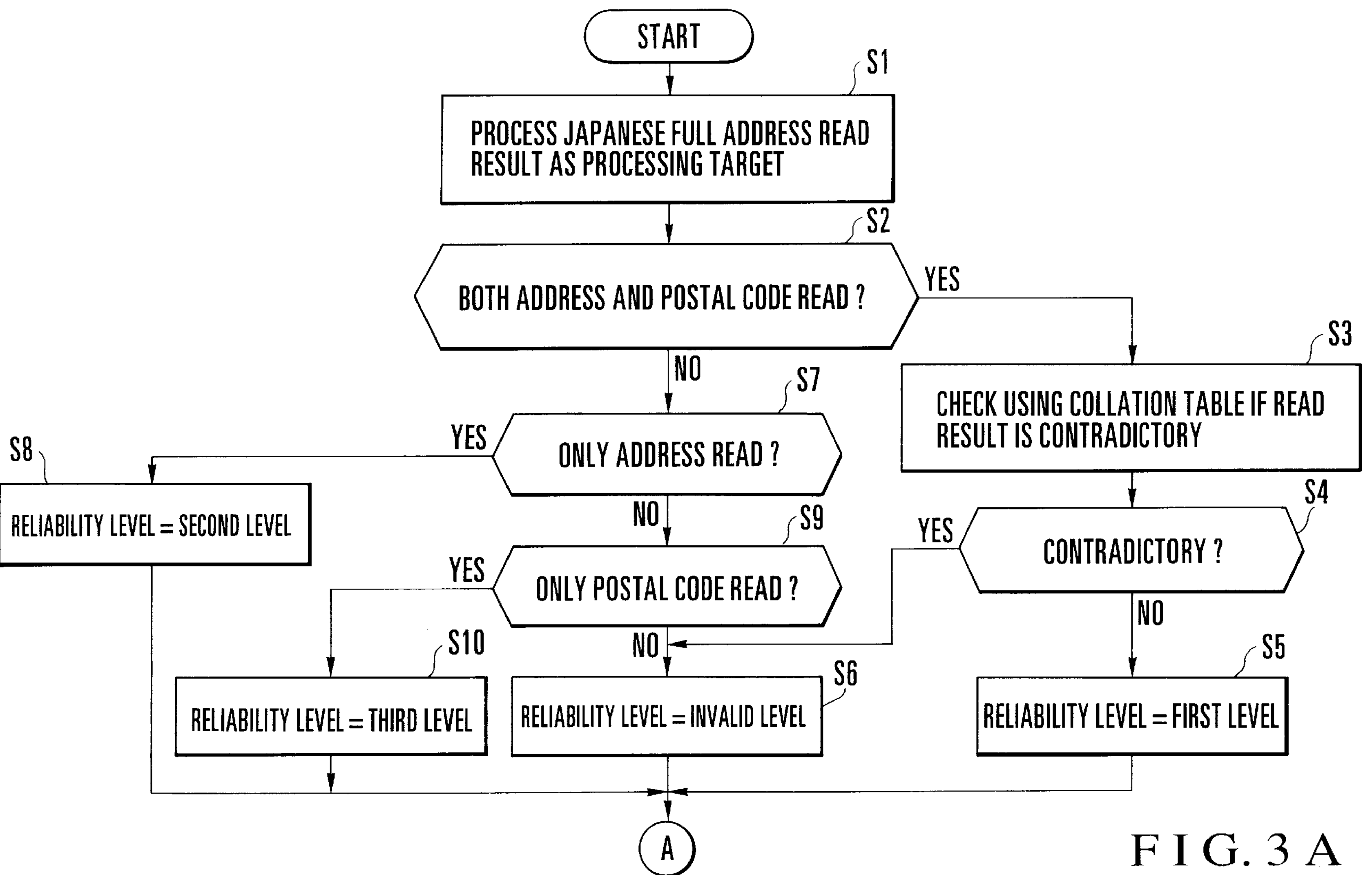
F I G. 3 A

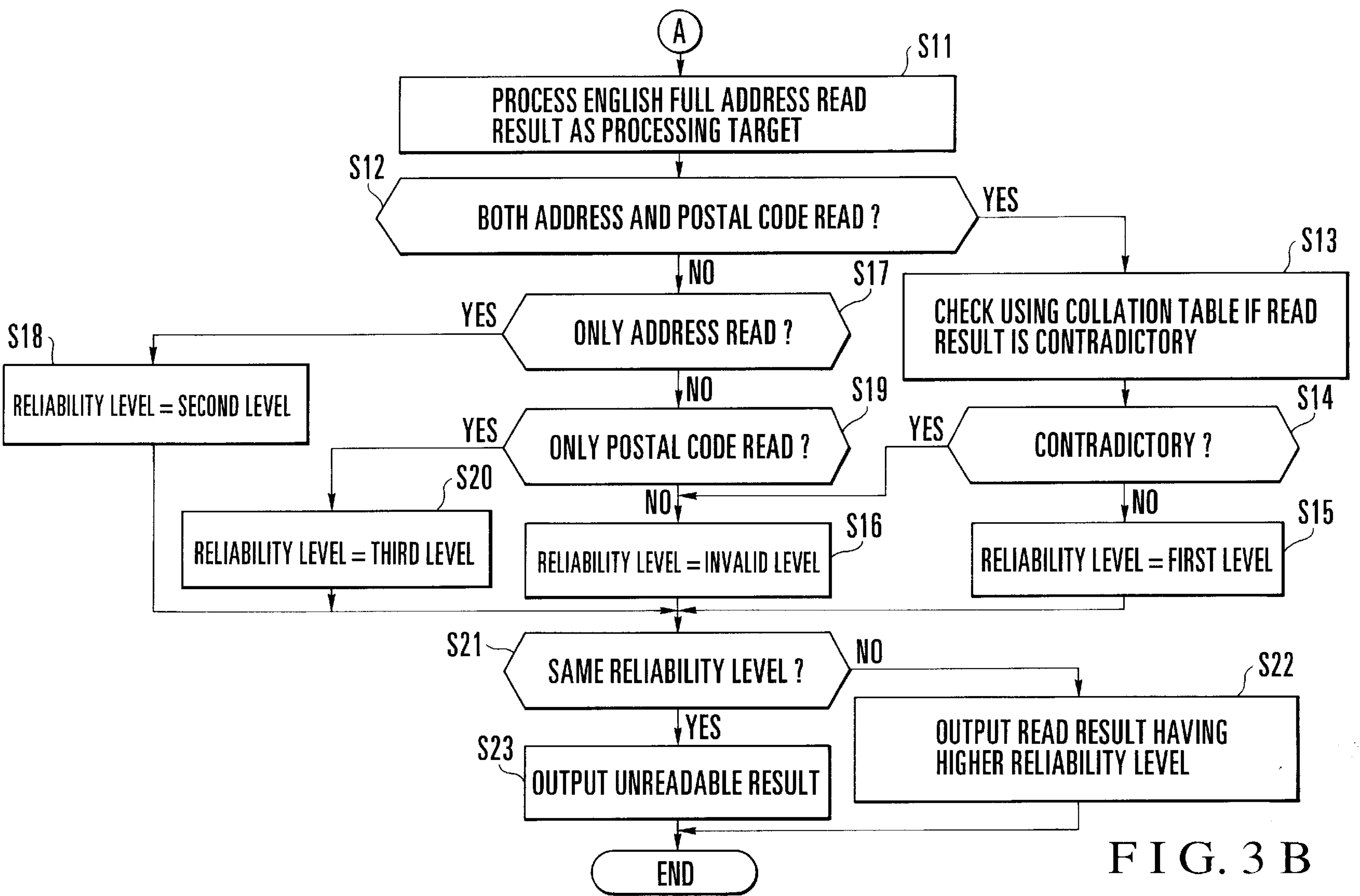
F I G. 3 B

MR. TARO NICHIDEN
1 - 10 NISSHIN-CHO
FUCHU-CITY TOKYO 183
JAPAN

BIO TETECHNOLOGIES INC.
1 - 10 NISSHIN-CHO
FUCHU-CITY TOKYO 183
JAPAN

0575-KOBE 175-36

FIG. 8

FULL ADDRESS READING APPARATUS

BACKGROUND OF THE INVENTION

The present invention relates to a full address reading apparatus for reading a postal code and address which are written/printed on a mail item and, more particularly, to a full address reading apparatus capable of reading full addresses with a high recognition rate even if a mail item on which the postal code and address are written/printed in a format using a first language is mixed with a mail item on which the postal code and address are written/printed in a format using a second language.

Various conventional full address reading apparatuses for reading full addresses (postal codes and addresses) written/printed on mail items are available.

For example, Japanese Patent Laid-Open No. 4-205686 discloses a Japanese full address reading apparatus for storing mail items on the basis of specific numbers (e.g., telephone numbers) for specifying addresses written/printed on the mail items when the addresses cannot be read in sorting the mail items by reading the addresses and postal codes written/printed on the mail items in the Japanese format. Japanese Patent Laid-Open No. 2-181287 discloses an English full address reading apparatus for reading a character string constituting an address, recognizing a plurality of wards, attributes of the wards, and positions of the wards from the read character string, and recognizing the address in accordance with the recognition result when the postal code and address written/printed on the mail item in the English format. Various other conventional full address reading apparatuses are known. In any case, each conventional full address reading apparatus has as a read target only a mail item on which the postal code and address are written/printed in the Japanese format or a mail item on which the postal code and address are written/printed in the English format. That is, only a mail item on which the postal code and address written/printed using a specific language serves as a read target.

In any conventional full address reading apparatus, the first problem is posed by a low recognition rate when a mail item on which the postal code and address are written/printed in a format using Japanese (first language) is mixed with a mail item on which the postal code and address are written/printed in a format using English (second language) due to the following reason. Any conventional full address reading apparatus has as a read target only a mail item on which the postal code and address are written/printed using a given specific language and can read only the mail item on which the postal or postal code and address are written/printed using either Japanese or English.

The second problem is posed by a high recognition error rate when a mail item on which the postal code and address are written/printed in a format using Japanese is mixed with a mail item on which the postal code and address are written/printed in a format using English due to the following reason. In the full address reading apparatus having as a read target a mail item on which the postal code and address are written/printed in the English format, a code number, a block number, or the like marked by a direct mail agent on a mail item having the Japanese format is often erroneously read as a postal code. In the full address reading apparatus having as a read target a mail item on which the postal code and address are written in the Japanese format, a code number, block number, or the like written/printed on a mail having the English format is often erroneously read as a postal code.

SUMMARY OF THE INVENTION

It is an object of the present invention to provide a full address reading apparatus capable of reading a full address at a low recognition error rate and a high recognition rate even if a mail item having a format using the first language is mixed with a mail item having a format using the second language.

In order to achieve the above object of the present invention, there is provided a full address reading apparatus comprising first full address reading means for reading a full address under an assumption that a postal code and address are written on a mail item as a read target in a format using a first language, second full address reading means for reading a full address under an assumption that a postal code and address are written on a mail item as a read target in a format using a second language, and selecting means for determining reliability levels of read results for the same read target from the first and second full address reading means and selecting and outputting a read result having a higher reliability level from the read results from the first and second full address reading means.

BRIEF DESCRIPTION OF THE DRAWINGS

FIG. 1 is a block diagram showing a full address reader according to an embodiment of the present invention;

FIG. 2 is a view showing an address and postal code collation table 5 shown in FIG. 1;

FIGS. 3A and 3B are flow charts showing processing of a selector 4 in FIG. 1;

FIG. 4 is a view showing a full address written/printed in a Japanese format;

FIG. 5 is a view showing a full address written/printed in an English format;

FIG. 6 is a view showing a full address when a Japanese full address reader outputs an erroneous postal code;

FIG. 7 is a view showing a full address when an English full address reader outputs an erroneous postal code; and FIG. 8 is a view showing a full address when the English full address reader outputs erroneous postal code and address.

DESCRIPTION OF THE PREFERRED EMBODIMENT

The present invention will be described in detail with reference to the accompanying drawings.

FIG. 1 shows an embodiment of the present invention, which comprises a scanner 1, a Japanese full address reader 2, an English full address reader 3, a selector 4, and an address and postal code collation table 5.

The scanner 1 has a function of scanning the surface of a mail item (not shown) on which a postal code and address are written/printed as a read target, and outputting image information of the mail item.

The Japanese full address reader 2 has a function of reading a postal code and address under an assumption that image information output from the scanner 1 is image information of a mail item on which the postal code and address are written in a Japanese format (first language), and outputting the Japanese full address read result.

The English full address reader 3 has a function of reading a postal code and address under an assumption that image information output from the scanner 1 is image information of a mail item on which the postal code and address are written in an English format (second language), and outputting the English full address read result.

The selector 4 has a function of using the address and postal code collation table 5 to determine the reliability level of the Japanese full address read result output from the Japanese full address reader 2 and the reliability level of the English full address read result output from the English full address reader 3, and outputting the read result having a higher reliability level as a full address read result. The selector 4 comprises a first determination unit 4*a* for determining the reliability level of the read result from the Japanese full address reader 2, a second determination unit 4*b* for determining the reliability level of the read result from the English full address reader 3, a third determination unit 4*c* for determining whether the read result from the Japanese full address reader 2 contradicts the read result from the English full address reader 2, and outputting a determination result to the first and second determination units 4*a* and 4*b*, and a comparator 4*d* for comparing the reliability levels output from the first and second determination units 4*a* and 4*b* and outputting the read result having a higher reliability level.

The address and postal code collation table (to be referred to as a collation table hereinafter) 6 is a table in which addresses are stored in correspondence with postal codes. FIG. 2 shows the contents of the collation table 5. As shown in FIG. 2, the names of metropolis and districts (administrative areas) are stored in correspondence with the postal codes assigned to these administrative areas in an area A at the head portion of the collation table 5. The names of wards and cities are stored in correspondence with the postal codes assigned to these wards and cities in an area B following the area A. Each of the name of ward or city in the area B belongs to one of the administrative areas in the area A. Each postal code stored in the area A is stored in correspondence with the name of each ward or city in the area B.

The operation of this embodiment will be described with reference to flow charts (FIGS. 3A and 3B) which represent processing of the selector 4. The scanner 1 scans each mail item as a read target and simultaneously outputs image information of the mail item to the Japanese and English full address readers 2 and 3.

Upon receiving the image information from the scanner 1, the Japanese full address reader 2 reads the postal code and address under an assumption that the image data from the scanner 1 is image information of a mail item on which the postal code and address are written/printed in the Japanese format. The Japanese full address reader 2 outputs a Japanese full address read result constituted by the postal code, the name of administrative area, and the name of ward or city. Note that information representing the presence of an unreadable item, if any, is output.

Upon receiving the image information from the scanner 1, the English full address reader 3 reads the postal code and address under an assumption that the image data from the scanner 1 is image information of a mail item on which the postal code and address are written/printed in the English format. The English full address reader 3 outputs an English full address read result constituted by the postal code, the name of administrative area, and the name of ward or city. Note that information representing the presence of an unreadable item, if any, is output.

Upon receiving the Japanese and English full address read results from the Japanese and English full address readers 2 and 3, the selector 4 performs processing in accordance with the flow charts in FIGS. 3A and 3B.

The determination unit 4*a* of the selector 4 uses as a processing target the Japanese full address read result output from the Japanese full address reader 2 (step S1) to determine whether the postal code and address are read (step S2). If both the name of administrative area and the name of ward or city are read or only the name of ward or city is read in step S2, the determination unit 4*a* determines that the address has been read. However, when neither the name of administrative area nor the name of ward or city are read or no information is read except the name of administrative area, the determination unit 4*a* determines that the address is not read.

When both the postal code and the address are read in step S2, the third determination unit 4*c* of the selector 4 checks using the collation table 5 if the relationship between the address and the postal code in the Japanese full address read result is contradictory (step S3). Processing in step S3 will be described in detail. It is first determined whether the name of administrative area is present in the Japanese full address read result. If so, an entry in which the name of administrative area is stored is searched in the collation table 5 from the beginning using as a key the name of administrative area present in the Japanese full address read result. It is then determined whether a postal code identical to that in the Japanese full address read result is present in the postal codes stored in the searched entry.

If no identical postal code is present, the third determination unit 4*c* recognizes the presence of contradiction in the relationship between the postal code and the address in the Japanese full address read result. If, however, an identical postal code is present, an entry in which the name of ward or city is stored is searched in the collation table 5 using as a key the name of ward or city present in the Japanese read result. It is then determined whether a postal code identical to that present in the Japanese full address read result is present in the postal codes of the searched entry. If not, the third determination unit 4*c* recognizes that the relationship between the postal code and address in the Japanese full address read result is contradictory; otherwise, the third determination unit 4*c* recognizes that the relationship between the postal code and address in the Japanese full address read result is not contradictory. If no name of administrative area is present in the Japanese full address read result, processing using the name of administrative area is not performed, but processing using the name of ward or city as a key is immediately performed. The detailed operations in step S3 have been described above.

If no contradiction is present in the relationship between the postal code and address in the Japanese full address read result, the first determination unit 4*a* of the selector 4*a* sets the reliability level of the Japanese full address read result as the first level (step S5). If a contradiction is present in step S4, the reliability level of the Japanese full address read result is set to an invalid level (step S6).

If neither the address nor the postal code are read in step S2, the first determination unit 4*a* of the selector 4 determines whether only the address is read or only the postal code is read (steps S7 and S9). If it is determined in step S7 that only the address is read, the first determination unit 4*a* sets the reliability level of the Japanese full address read result to the second level (step S8). If it is determined in step S9 that only the postal code is read, the first determination unit 4*a* sets the reliability level of the Japanese full address read result to the third level (step S10). If it is determined in steps S7 and S9 that neither the postal code nor the address are read, the first determination unit 4*a* determines the reliability level of the Japanese full address read result to the invalid level (step S6). In this embodiment, the first level represents the highest reliability level, and the reliability level decreases in the order of the second level, the third level, and the invalid level.

As described above, when the reliability level of the Japanese full address read result is determined, the second and third determination units 4*b* and 4*c* of the selector 4 performs the same processing as described above for the English full address read result output from the English full address reader 3, as shown in the flow chart of FIG. 3B, thereby determining the reliability level of the English full address read result (steps S11 to S20). Note that steps S11 to S20 are identical to steps S1 to S10, and a detailed description thereof will be omitted.

When the reliability level of the English full address read result is determined in steps S11 to S20, the comparator 4*d* compares the reliability level of the English full address read result with the reliability level of the Japanese full address read result (step S21). If the reliability levels of the English and Japanese full address read results are different from each other in step S21, the result having a higher reliability level is selected from the Japanese and English full address read results and output (step S22). If the reliability levels of the two read results are equal to each other in step S21, an unreadable full address read result is output regardless of the reliability levels of the read results (step S23).

Figure 4:
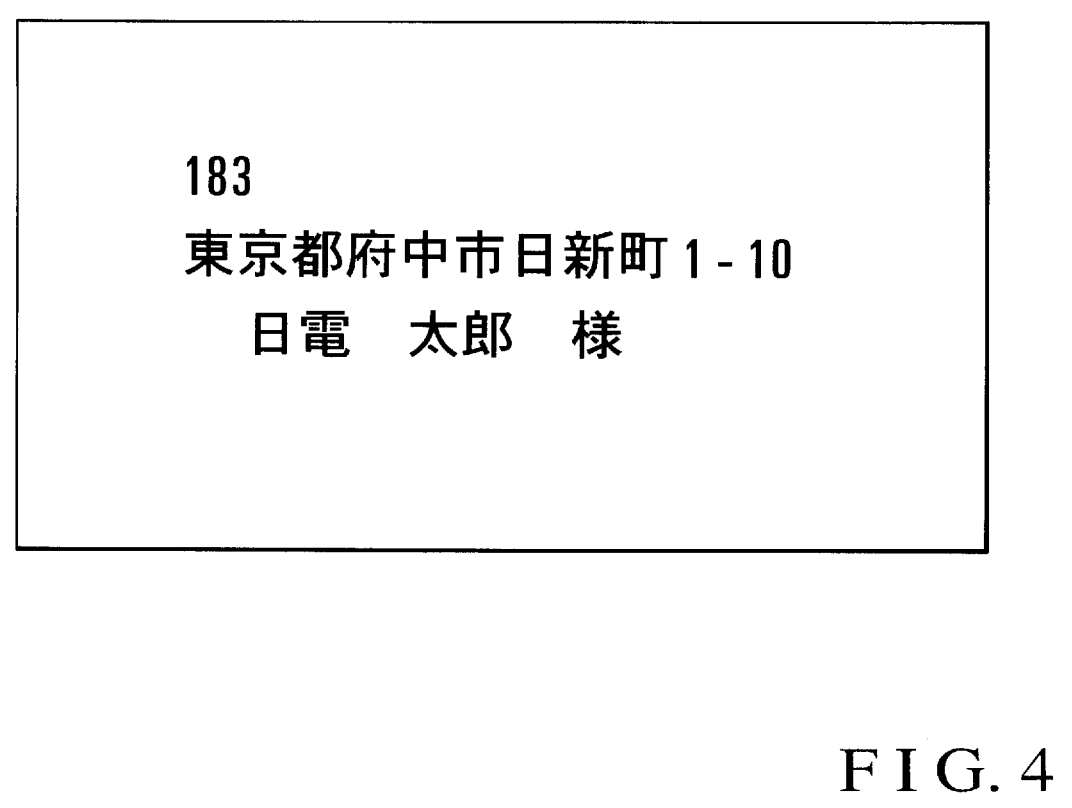

The operation of this embodiment will be described in detail with reference to a full address written/printed on a mail item. Assume that image information output from the scanner 1 represents a full address written/printed in the Japanese (first language) format. Note that the address in Japanese in FIG. 4 represents the same address in English in FIG. 5.

The Japanese full address reader 2 reads a postal code and address under an assumption that image information output from the scanner 1 is image information of a mail item on which the postal code and address are written in a Japanese format. The Japanese full address reader 2 reads image information as a postal code when the reader 2 determines that three digits (three digits+hyphen+two digits) are written/printed at the upper left corner of the full address area on the basis of the image information.

The English full address reader 3 reads a postal code and address under an assumption that image information output from the scanner 1 is image information of a mail item on which the postal code and address are written in an English format. The English full address reader 3 reads image information as a postal code when the reader 3 determines that three digits (three digits+hyphen+two digits) are written/printed at the lower right corner of the full address area on the basis of the image information.

In this case, since the postal code and address are written/printed in the Japanese format on a mail item as a read target, Japanese and English full address read results (A) and (B) respectively output from the Japanese and English full address readers 2 and 3 are given as follows.

Japanese full address read result (A):
- Postal code:
  - 183
- Name of administrative area:
  - TOKYO (recognized in Japanese)
- Name of ward or city:
  - FUTYU-CITY (recognized in Japanese)

English full address read result (B):
- Postal code:
  - unreadable
- Name of administrative area:
  - unreadable
- Name of ward or city:
  - unreadable When the Japanese and English full address readers 2 and 3 output the Japanese and English full address read results (A) and (B), respectively, the first determination unit 4*a* of the selector 4 checks the reliability level of the Japanese full address read result (A) as a processing target first (steps S1 to S10 in FIG. 3A). In this case, all pieces of information, i.e., the postal code, the name of administrative area, and the name of ward or city are read in the Japanese full address read result (step S2: YES), and the relationship between the postal code and the name of administrative area and the relationship between the postal code and the name of ward or city are not contradictory (step S4: NO). The first determination unit 4*a* determines the reliability level of the Japanese full address read result (A) as the first level (step S5).

The second determination unit 4*b* of the selector 4 checks the reliability level of the English full address read result (B) as a processing target (steps S11 to S20 in FIG. 3B). In this case, all pieces of information, i.e., the postal code, the name of administrative area, and the name of ward or city are unreadable in the English full address read result (step S12: NO, step S17: NO, step S19: NO). The second determination unit 4*b* determines the reliability level of the English full address read result (B) as the invalid level (step S16).

Since the reliability levels of the Japanese and English full address read results (A) and (B) are the first level and the invalid level, respectively, the comparator 4*d* of the selector 4 outputs the Japanese full address read result (A) having a higher reliability level as a full address read result (step S22).

A case in which image information representing a full address written/printed in the English (second language) format shown in FIG. 5 is output from the scanner 1 will be described below. In this case, Japanese and English full address read results (C) and (D) respectively output from the Japanese and English full address readers 2 and 3 are as follows.

Japanese full address read result (C):
- Postal code:
  - unreadable
- Name of administrative area:
  - unreadable
- Name of ward or city:
  - unreadable English full address read result (D):
- Postal code:
  - 183
- Name of administrative area:
  - TOKYO (recognized in English)
- Name of ward or city:
  - FUTYU-CITY (recognized in English)

When the Japanese and English full address readers 2 and 3 output the Japanese and English full address read results (C) and (D), respectively, the first and second determination units 4*a* and 4*b* obtain the reliability levels of the Japanese and English full address read results (C) and (D), respectively (steps S1 to S20 in FIGS. 3A and 3B). In this case, all pieces of information, i.e., the postal code, the name of administrative area, and the name of ward or city are unreadable in the Japanese full address read result (step S2: NO, step S7: NO, step S9: NO). The first determination unit 4*a* determines the reliability level of the Japanese full address read result (C) as the invalid level (step S6). All pieces of information, i.e., the postal code, the name of administrative area, and the name of ward or city are read in the English full address read result (step S12: YES), and the relationship between the postal code and the name of administrative area and the relationship between the postal code and the name of ward or city are not contradictory (step S14: NO). The second determination unit 4*b* determines the reliability level of the English full address read result (D) as the first level (step S15).

Since the reliability levels of the Japanese and English full address read results (C) and (D) are the invalid level and the first level, respectively, the comparator 4*d* of the selector 4 outputs the English full address read result (D) having a higher reliability level as a full address read result (step S22).

Figure 6:
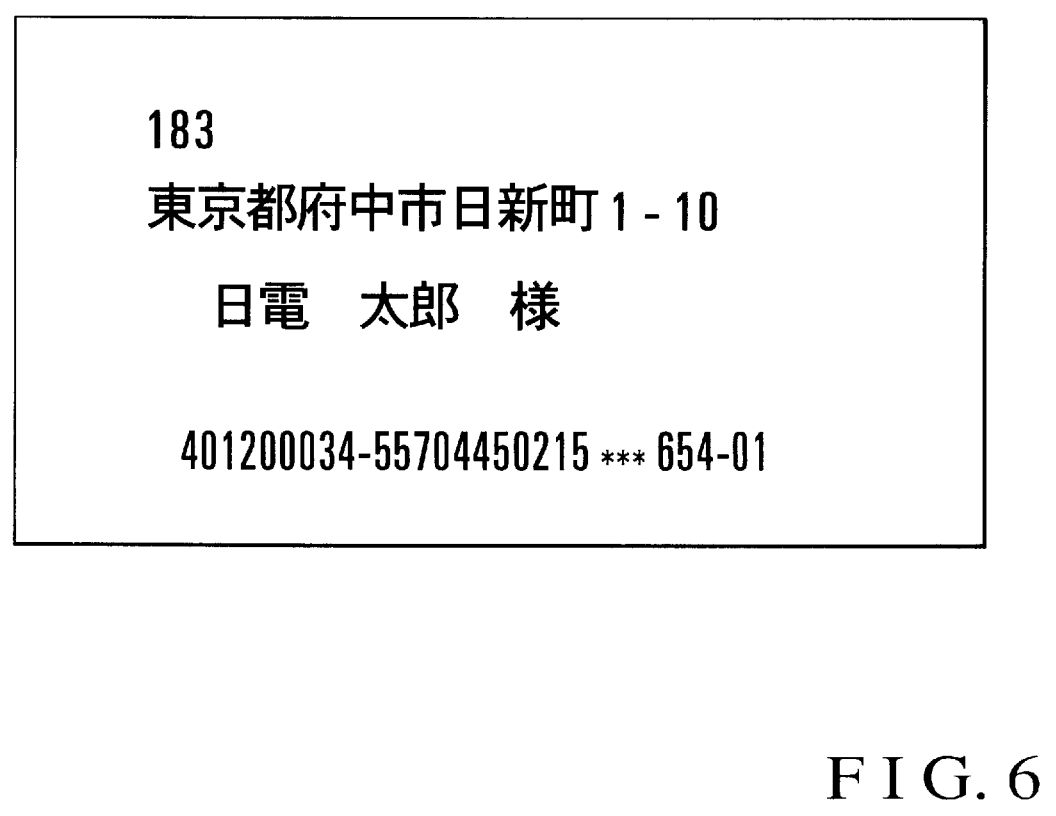

A case in which image information representing a character string in FIG. 6 is output from the scanner 1 will be described below. Referring to FIG. 6, a character string on the last line is a character string added for filing convenience in mailing by a direct mail agent and is not part of a full address.

The Japanese full address reader 2 reads a postal code and address under an assumption that image information output from the scanner 1 is image information of a mail item on which the postal code and address are written in a Japanese format. As a result, the Japanese full address reader 2 outputs a Japanese full address read result (E).

Japanese full address read result (E):

Postal code:
183

Name of administrative area:
TOKYO (recognized in Japanese)

Name of ward or city:
FUTYU-CITY (recognized in Japanese)

The English full address reader 3 reads a postal code and address under an assumption that image information output from the scanner 1 is image information of a mail item on which the postal code and address are written in an English format. In this case, since a character string "651-01" similar to a postal code is written/printed in the lower right corner of the full address area, the English full address reader 3 erroneously reads it as a postal code. As a result, the English full address reader 3 outputs an English full address read result (F) as follows.

English full address read result (F):

Postal code:
654-01

Name of administrative area:
unreadable

Name of ward or city:
unreadable

When the Japanese and English full address readers 2 and 3 output the Japanese and English full address read results (E) and (F), respectively, the first and second determination units 4*a* and 4*b* obtain the reliability levels of the Japanese and English full address read results (E) and (F), respectively (steps S1 to S20 in FIGS. 3A and 3B). In this case, all pieces of information, i.e., the postal code, the name of administrative area, and the name of ward or city are read in the Japanese full address read result (E) (step S2: YES), and the relationship between the postal code and the name of administrative area and the relationship between the postal code and the name of ward or city are not contradictory (step S4: NO). The first determination unit 4*a* determines reliability level=first level (step S5). In the English full address read result (F), only the postal code is read (step S19: YES), and the second determination unit 4*b* determines reliability level=third level (step S20).

Since the reliability levels of the Japanese and English full address read results (E) and (F) are the first level and the third level, respectively, the comparator 4*d* of the selector 4 outputs the Japanese full address read result (E) having a higher reliability level as a full address read result (step S22).

Figure 7:
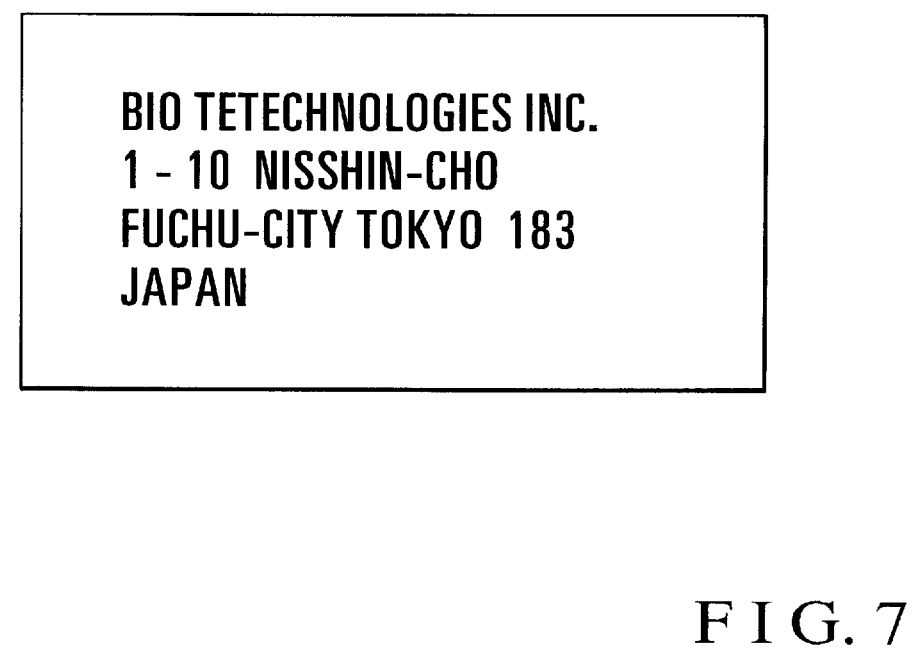

A case in which image information representing a full address written/printed in the English format shown in FIG. 7 is output from the scanner 1 will be described below.

The Japanese full address reader 2 reads a postal code and address under an assumption that image information output from the scanner 1 is image information of a mail item on which the postal code and address are written in a Japanese format. In this case, a character string "BIO" at the upper left corner of the full address area is very similar in shape to a three-digit postal code "810". For this reason, the Japanese full address reader 2 erroneously reads "BIO" as the postal code "810". A Japanese full address read result (G) output from the Japanese full address reader 2 is given as follows.

Japanese full address read result (G):

Postal code:
810

Name of administrative area:
unreadable

Name of ward or city:
unreadable

The English full address reader 3 reads a postal code and address under an assumption that image information output from the scanner 1 is image information of a mail item on which the postal code and address are written in an English format. As a result, an English full address read result (H) output from the English full address reader 3 is given as follows.

English full address read result (H):

Postal code:
183

Name of administrative area:
TOKYO (recognized in English)

Name of ward or city:
FUTYU-CITY (recognized in English)

When the Japanese and English full address readers 2 and 3 output the Japanese and English full address read results (G) and (H), respectively, the first and second determination units 4*a* and 4*b* obtain the reliability levels of the Japanese and English full address read results (G) and (H), respectively (steps S1 to S20 in FIGS. 3A and 3B). In this case, in the Japanese full address read result (G), only the postal code is read (step S2: NO, step S7: NO, step S9: YES), and the first determination unit 4*a* determines reliability level= third level (step S10). All pieces of information, i.e., the postal code, the name of administrative area, and the name of ward or city are read in the English full address read result (step S12: YES), and the relationship between the postal code and the name of administrative area and the relationship between the postal code and the name of ward or city are not contradictory (step S14: NO). The second determination unit 4*b* determines reliability level=first level (step S15).

Since the reliability levels of the Japanese and English full address read results (G) and (H) are the third level and the first level, respectively, the comparator 4*d* of the selector 4 outputs the English full address read result (H) having a higher reliability level as a full address read result (step S22).

Figure 8:
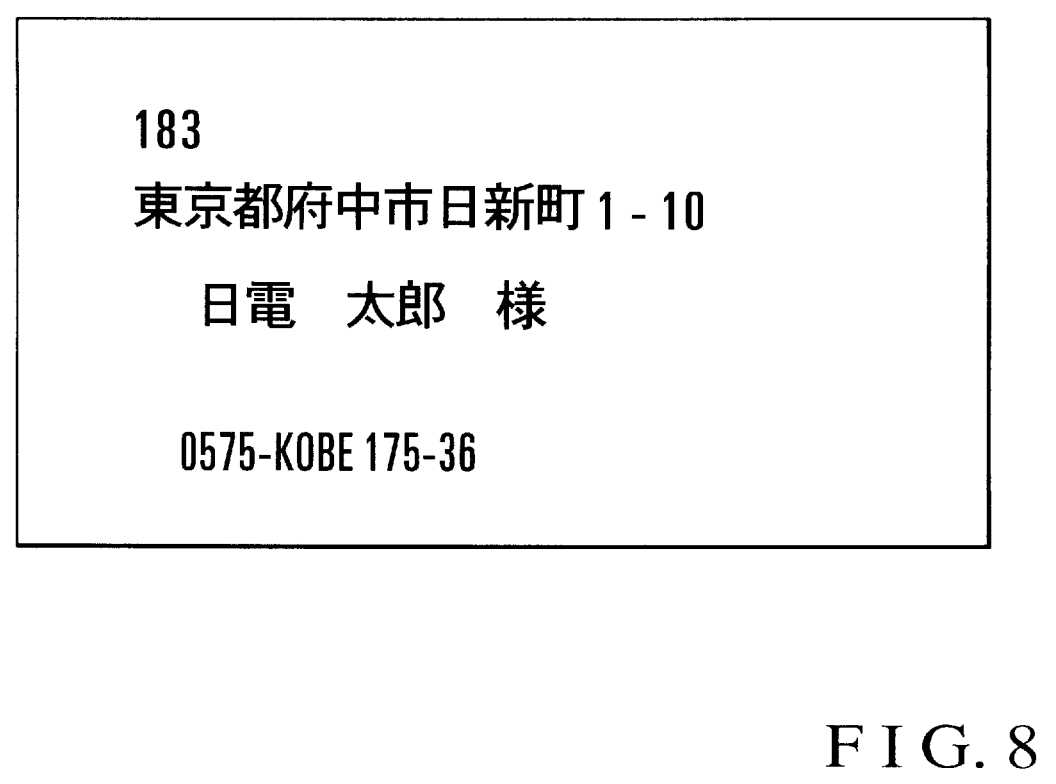

A case in which image information representing a character string in FIG. 8 is output from the scanner 1 will be described below. Referring to FIG. 8, a character string on the last line is a character string added for filing convenience in mailing by a direct mail agent and is not part of a full address.

The Japanese full address reader 2 reads a postal code and address under an assumption that image information output from the scanner 1 is image information of a mail item on which the postal code and address are written in a Japanese format. As a result, the Japanese full address reader 2 outputs a Japanese full address read result (I).

Japanese full address read result (I):

Postal code:
183
Name of administrative area:
TOKYO (recognized in Japanese)
Name of ward or city:
FUTYU-CITY (recognized in Japanese)

The English full address reader 3 reads a postal code and address under an assumption that image information output from the scanner 1 is image information of a mail item on which the postal code and address are written in an English format. In this case, since a character string "0575-KOBE 175-36" similar to a postal code in the English format is written/printed in the lower right corner of the full address area, the English full address reader 3 erroneously reads "KOBE" and "175-36" as the name of ward or city and a postal code, respectively. As a result, the English full address reader 3 outputs an English full address read result (J) as follows.

English full address read result (J):

Postal code:
175-36
Name of administrative area:
unreadable
Name of ward or city:
KOBE (recognized in English)

When the Japanese and English full address readers 2 and 3 output the Japanese and English full address read results (I) and (J), respectively, the first and second determination units 4*a* and 4*b* obtain the reliability levels of the Japanese and English full address read results (I) and (J), respectively (steps S1 to S20 in FIGS. 3A and 3B). In this case, all pieces of information, i.e., the postal code, the name of administrative area, and the name of ward or city are read in the Japanese full address read result (I) (step S2: YES), and the relationship between the postal code and the name of administrative area and the relationship between the postal code and the name of ward or city are not contradictory (step S4: NO). The first determination unit 4*a* determines reliability level first level (step S5). In the English full address read result (J), although the postal code and the name of ward or city are read (step S12: YES), the relationship between the postal code and the name of ward or city is contradictory (step S14: YES). The second determination unit 4*b* determines reliability level=invalid level (step S16).

Since the reliability levels of the Japanese and English full address read results (I) and (J) are the first level and the invalid level, respectively, the comparator 4*d* of the selector 4 outputs the Japanese full address read result (I) having a higher reliability level as a full address read result (step S22).

As has been described above, according to the present invention, of the read results from the Japanese and English full address readers, a read result having a higher reliability level is output. Therefore, even if a mail item on which the postal code and address are written/printed in the Japanese format is mixed with a mail item on which the postal code and address are written/printed in the English format, a full address can be read at a low recognition error rate and a high recognition rate.

Of the read results, a read result having no contradiction in the relationship between the postal code and the address is determined to have a higher reliability level. Even if the postal code and the address are read by both the Japanese and English full address readers, the correct postal code and address can be selected with a high probability.

What is claimed is:

1. A full address reading apparatus comprising:

first full address reading means for reading a full address under an assumption that a postal code and address are written on a mail item as a read target in a format using a first language;

second full address reading means for reading a full address under an assumption that a postal code and address are written on a mail item as a read target in a format using a second language; and selecting means for determining reliability levels of read results for the same read target from said first and second full address reading means and selecting and outputting a read result having a higher reliability level from the read results from said first and second full address reading means.

2. An apparatus according to claim 1, wherein said selecting means comprises:

first determining means for determining a reliability level of the read result from said first full address reading means;

second determining means for determining a reliability level of the read result from said second full address reading means; and comparing means for comparing the reliability levels output from said first and second determining means and outputting the read result having a higher reliability level.

3. An apparatus according to claim 2, wherein said selecting means comprises third determining means for determining whether the read results from said first and second full address reading means are contradictory, and said first and second determining means determines the reliability levels of the read results in consideration of a determination result from said third determining means.

4. An apparatus according to claim 3, further comprising a collation table which stores an address and a postal code in a one-to-one correspondence, and wherein said third determining means determines whether a relationship between a postal code and an address read using said collation table is contradictory.

5. An apparatus according to claim 3, wherein each of said first and second determining means sets one of reliability levels ranging from a first level to an invalid level for the read results from said first and second full address reading means, and said comparing means compares two set levels and selects a read result having a higher level.

6. An apparatus according to claim 5, wherein, upon reading both a postal code and an address, each of said first and second determining means sets the first level as a reliability level when said third determining means determines that a read result is not contradictory, and each of said first and second determining means sets the invalid level as a reliability level when said third determining means determines that a read result is contradictory.

7. An apparatus according to claim 5, wherein each of said first and second determining means sets the second level as a reliability level when only an address is read, and the third level as a reliability level when only a postal code is read.

8. An apparatus according to claim 1, wherein each of said first and second determining means sets the invalid level as a reliability level when neither a postal code nor an address are read.

* * * * *